Sept. 22, 1953 M. L. HAYES 2,652,842
ENVELOPE TREATING APPARATUS, PARTICULARLY
GLASS ENVELOPES FOR CATHODE-RAY TUBES
Filed April 7, 1950 4 Sheets-Sheet 4
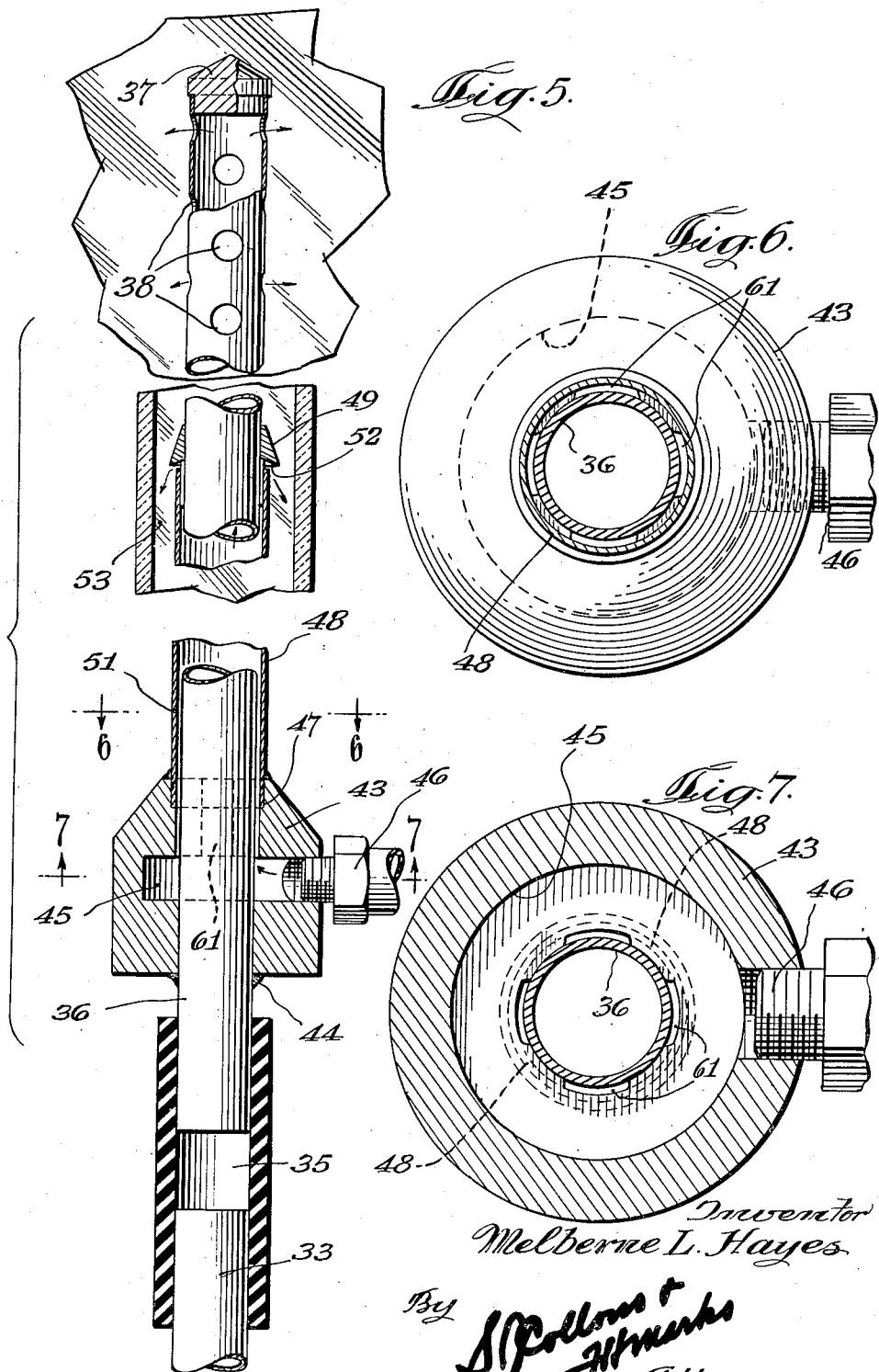
Inventor
Melberne L. Hayes
By
Attorneys

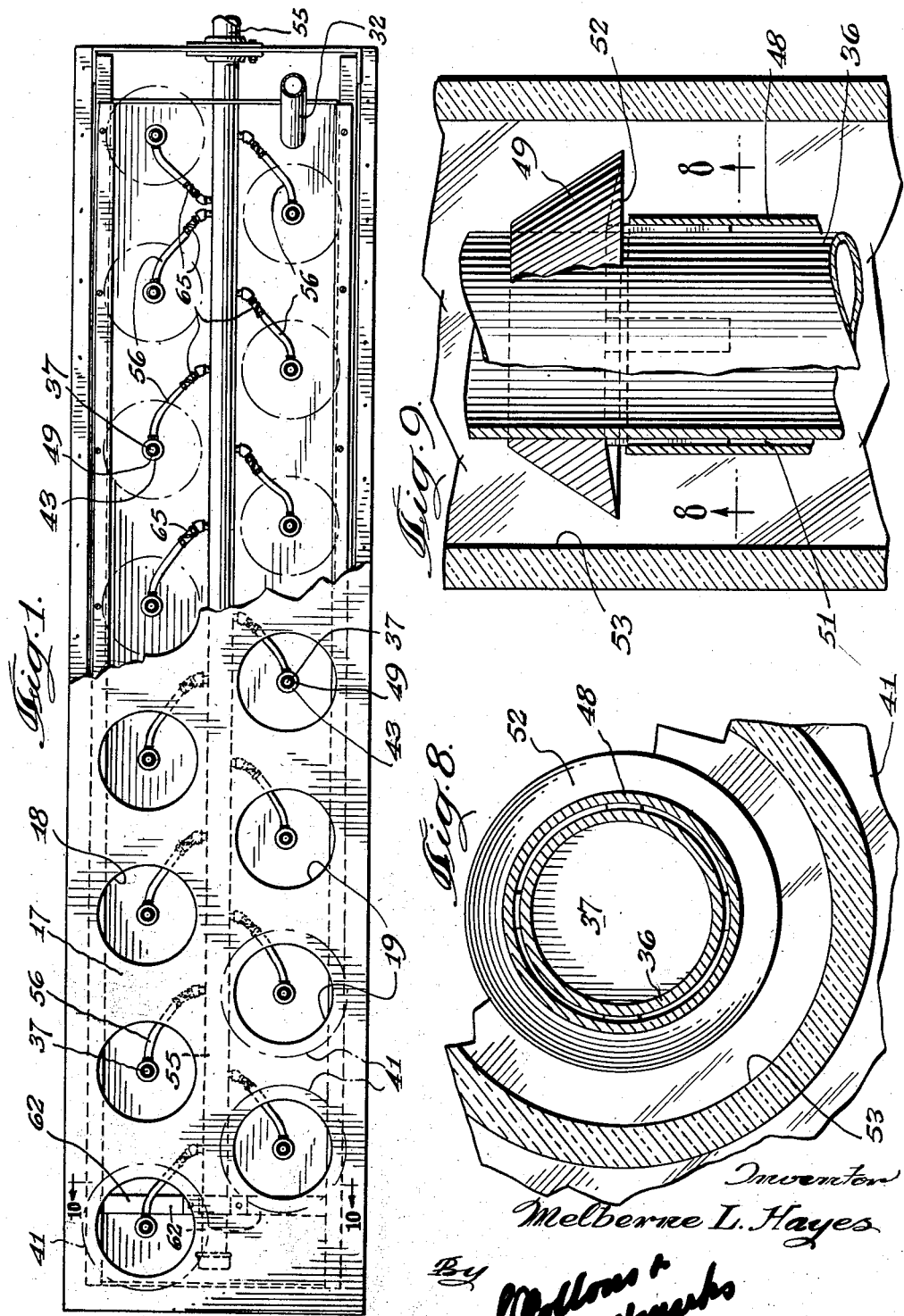

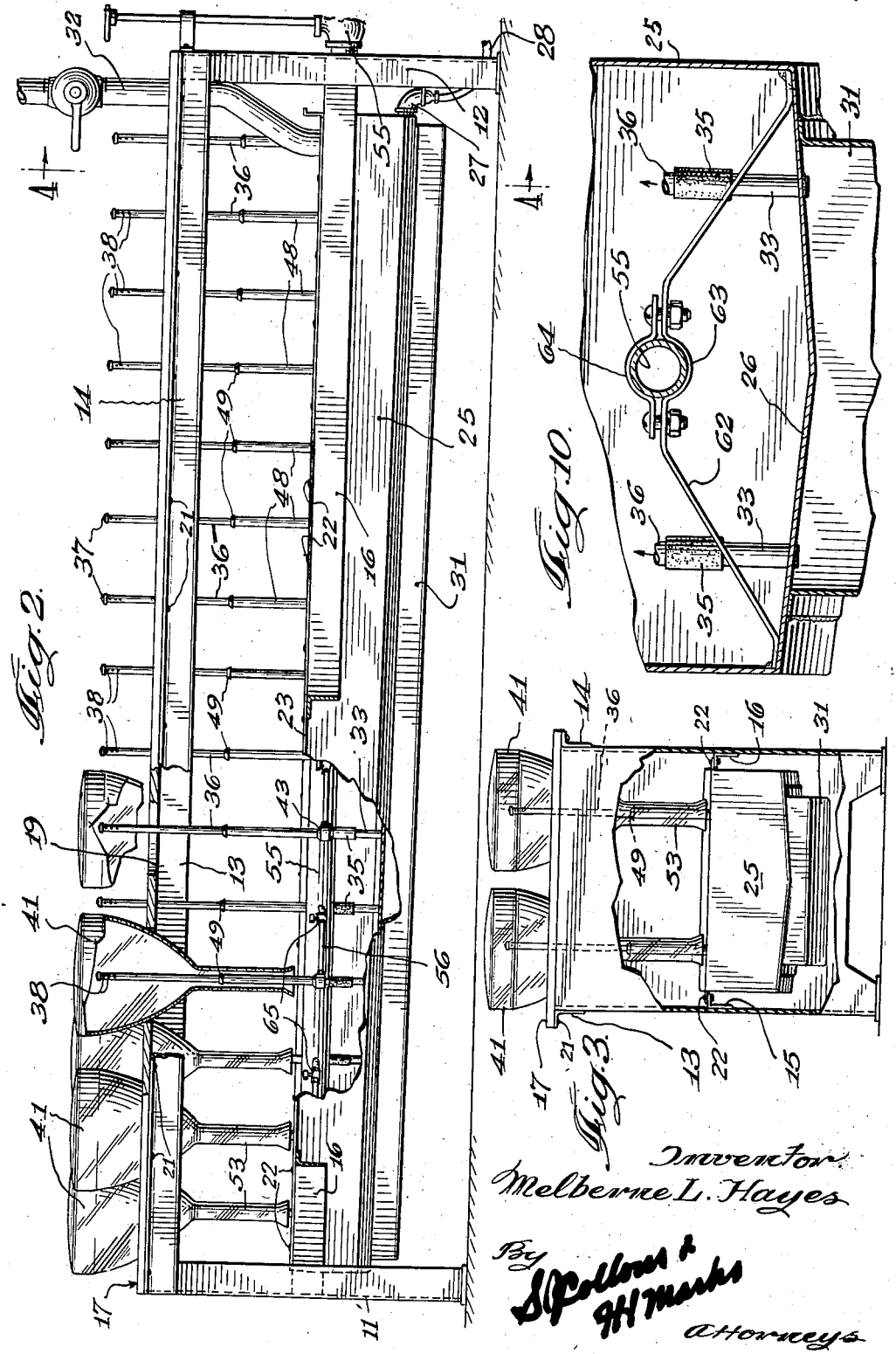

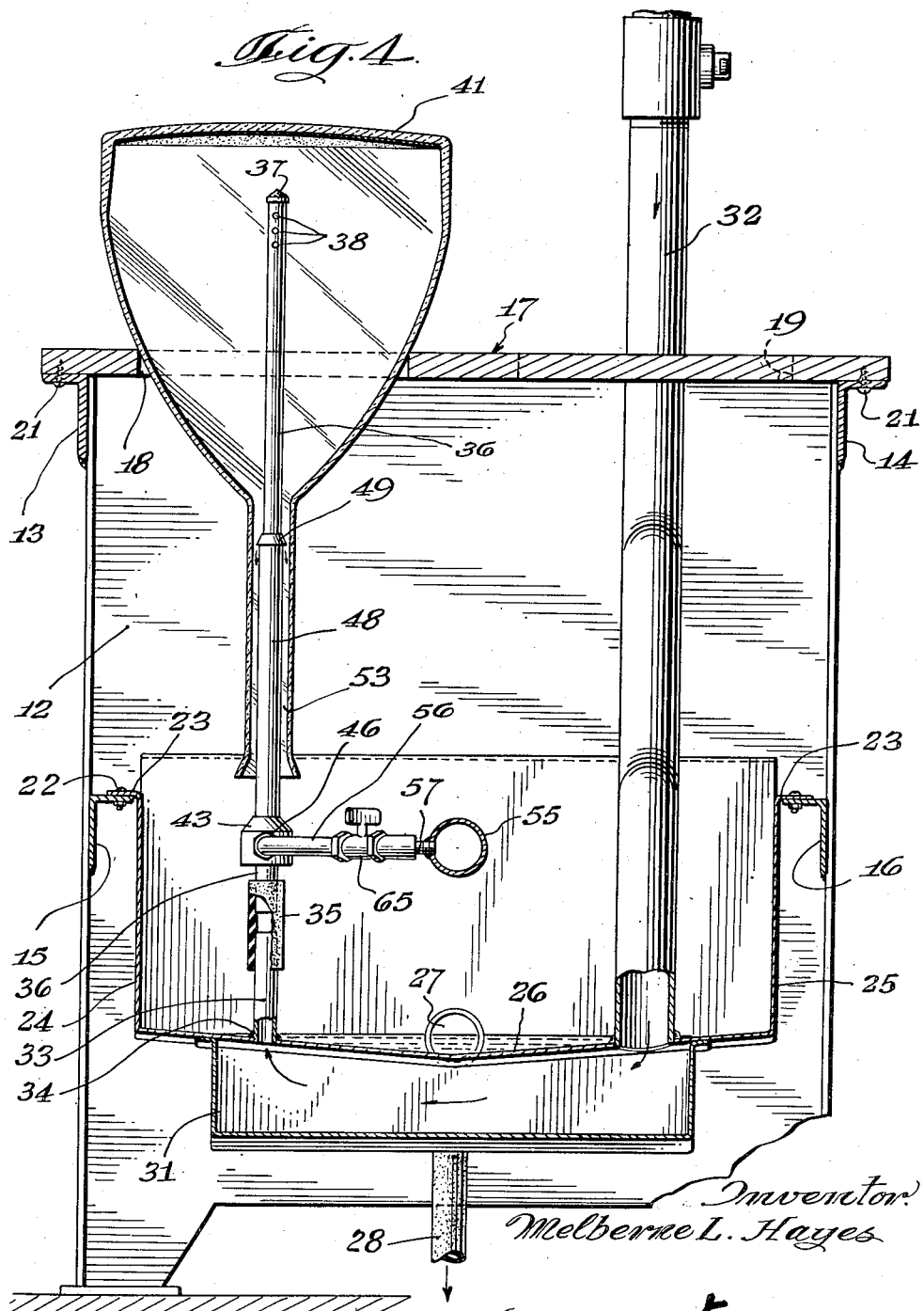

Patented Sept. 22, 1953

2,652,842

UNITED STATES PATENT OFFICE 2,652,842

ENVELOPE TREATING APPARATUS, PARTICULARLY GLASS ENVELOPES FOR CATHODE-RAY TUBES

Melberne L. Hayes, Oak Park, Ill., assignor to National Video Corporation, Chicago, Ill., a corporation of Illinois Application April 7, 1950, Serial No. 154,655

3 Claims. (Cl. 134—99)

The present invention relates to apparatus for simultaneously air drying and neck rinsing envelopes, particularly glass envelopes of the type which are utilized in the manufacture of cathode ray picture tubes.

In conformity with prevailing practices in connection with fluorescent coated video cathode ray tubes, it is of significance to achieve as rapidly and as expeditiously as possible a drying of the inner tube surface following the application of the fluorescent screen deposit in order that subsequent steps may be undertaken without extensive delay.

This drying operation constitutes a vexatious delay in the progress of the glass bottle conditioning sequences, and because of the relative complete enclosure of these envelopes, they are rendered less susceptible to evaporation. Accordingly, means is provided whereby warmed air currents are forcibly introduced into the envelope under conditions whereby the exuded warm air currents may carry away the evaporation moisture at a rapid rate and whereby to produce a satisfactory drying of the inner surfaces of the tube free from soil exposure and stray contamination.

This operation follows the decanting of the screening phosphor colloidal liquor since there frequently remains residual colloidal sediment on the inner surface of the neck of the tube because the final drainage of the liquor is attended with but minute current velocity. At such slow drainage and low volume level these traces of residual deposit invariably remain on the surface of the tube neck requiring, in accordance with heretofore practiced methods, a secondary rinse, whereas the principal body of the tube having no such deposit but instead with its moisture drawn off is in readiness for drying, as aforestated.

It is, accordingly, an object of the present invention to achieve a single assembly-line treating apparatus which will facilitate the accomplishment of rinsing the necks whilst drying the conoid space of picture tubes under a simultaneous or concurrent treating practice.

Another object of the present invention is to devise an insertable nozzle fixture which is capable of facile manipulation, which will administer a jet of drying air predeterminedly tempered to suit the accomplishment of this function, while at the same time direct rinsing stream of liquid to the neck portion of the envelope or bottle so that residual deposit traces which are consequent to the slow decanting operations may be effectively washed away.

In the attainment of these and other objective purposes of the present invention, there is utilized a fixture table having a top surface appropriately apertured to receive in neck-down condition alignments of video picture tubes of various dimensions. As the tubes are thus placed and inserted on the fixture table, they are also directed to receive within their neck-down extremities duplex utility nozzles which are provided with channelways for directing drying air currents to the upper portions of the tubes and water stream jets to the neck portions of the tubes, so that after the capacity of a fixture table has been fully laden with picture tube envelopes in readiness for receiving the drying and washing treatments, by simply regulating air and water control valves to these various jets and permitting the two fluid streams to act upon the tubes simultaneously, there is accomplished a battery simultaneous treatment which conditions the tubes effectively and expeditiously and prepares them for an ensuing process at a much more rapid rate of advancement than these operations have been accomplished by heretofore known methods of treatment.

For a better understanding of the present invention, reference will now be had to the accompanying drawings and to a detail specification, following hereinafter in both of which like reference numerals designate corresponding parts throughout.

In the following drawings:

Fig. 1 is a plan view with portions broken away of a fixture table and incorporated apparatus having embodied therein various features of the present invention;

Fig. 2 is a side elevational view with portions broken away of the same type of fixture table featured in Fig. 1;

Fig. 3 is an end elevational view with portions broken away of the apparatus disclosed in Figs. 1 and 2;

Fig. 4 is an enlarged sectional view taken approximately along the lines 4—4 of Fig. 2;

Fig. 5 is a view enlarged on an even greater scale of the nozzle construction and its attendant conduit connections;

Fig. 6 is an enlarged detail view taken approximately on the line 6—6 of Fig. 5;

Fig. 7 is an enlarged sectional view taken approximately on the line 7—7 of Fig. 5;

Fig. 8 is an enlarged transverse sectional view taken approximately on the line 8—8 of Fig. 9;

Fig. 9 is an enlarged longitudinal sectional view of a deflector flange carried by the joint water and air stream nozzle; and Fig. 10 is a fragmentary detail view taken approximately along the line 10—10 of Fig. 1.

The principal supporting structure of the treating fixture which is to be described in conjunction with the annexed drawings may be observed from Figs. 1 and 2 to be assembled from a pair of angularly formed end frames 11 and 12, profiled after the manner indicated in Fig. 4 and connected together at an upper level by the longitudinally extending angle iron beams 13 and 14 and at an intermediate level by the longitudinally extending angle iron beams 15 and 16. The top is covered with a table level plank 17 within the surface of which there are formed two rows of apertures 18 and 19 transversely staggered, as best indicated in Fig. 1, which table top may be secured as by wood screws 21 to the horizontal flanges of beams 13 and 14.

The horizontal flanges of beams 15 and 16 are provided with a series of holes through which pass the securing screws 22, whereby is held the side flanges 23 of a drainage trough comprised of a sloping sheet metal formation whose sides are designated 24 and 25 and whose bottom wall 26 consists of a downwardly and inwardly sloping wall section to which is connected a drainage fitting 27 so that the discharge washing water may be carried away or filtered for re-use by apparatus to which it is connected over the conduit 28.

Beneath the bottom wall 26 there is attached a space enclosing cubicle 31 through which drying air is distributed in an equalized-pressure manner from the supply source 32 to all of the jet nipples 33 which are vertically disposed and secured to the wall 26 as by soldering or welding 34, Fig. 4.

Each vertical connection nipple 33 fits into a short length of moderately flexible tubing 35, the other end of which receives a similar diameter of air stream tubing 36 which extends on up to a level best designated in Figs. 2 and 4, terminating with a plug fit end cap 37 and being provided in the last few inches of its upper extremity with a generous and equally spaced distribution of egress apertures 38 through which the air is directed with equal velocity to all surfaces within a tube envelope 41 when it is disposed in the drying positions indicated in Figs. 2, 3 and 4. Because of the flexible connection 35, the upstanding jet is free to be flexed in all directions so as to permit the envelopes 41 to seat themselves in conformity with the table apertures 18 and 19 without being restrained by possible misalignment on the part of the jets.

Attention is now directed to Figs. 5 to 9 where it will be observed that in their nether portions the tubes 36 are each provided with a slide fit collar fitting 43 which may be secured by soldering or welding as at 44 and which is provided with a circumferential inner channel 45 that communicates with a supply aperture threaded to receive a nipple 46. Surrounding the tubes 36 and seated in an annular recess 47 in the fitting 43 is a secondary length of tubing designated 48 which extends upwardly for a significant distance ending at close spacing from a downwardly directing deflection flange 49 which may be permanently secured to the tubing 36 and which functions to divert a water stream that is permitted to enter the channelway 45 and work itself up through the spacing 51 between the tubings 36 and 48 to strike against the conical under surface 52 of the flanges 49 and be deflected in a sharply outward direction so as to apply a curtain of water onto the inner neck surface 53, Fig. 5, of the envelopes 41.

The water supply may be obtained from a circulating filtered system or from any other supply source over conduit 55, which is valve controlled and which is tapped at spaced intervals corresponding with the distribution of jets, whereby each of the fittings 43 through its nipple 46 is connected by means of a length of flexible tubing 56 with the main supply pipe 55 at one of its nipple taps 57, Fig. 4. In order to maintain concentric the two relatively thin conduits 36 and 48, they may be provided at equally disposed peripheral spacings on one or the other with shallow protuberances throughout the length of their overlapping section, and further the fittings 43 may be vertically fluted as at 61 at the point of emergence which connects with the circumferential channel 45.

In order to give adequate physical support to the relatively heavy water supply pipe 55, there may be provided at each end of the tank a flat steel strap bracket 62 having a nesting curvature, as at 63, and adjacent holes for receiving a cap clamp 64.

In operation, the fixture table is loaded with a full placement of picture tube envelopes 41 occupying all of the available capacity of where all of the capacity is not utilized, the water supply is preferably turned off by means of the stop cocks 65 which are located in the flexible tubing connection with the principal supply pipe 55 of each water supply nipple 46. Under either of these described conditions of operation the treatment process is accomplished by turning on at their control valves the air supply pipe 32 and the water supply pipe 55. The respective fluids will then be directed, the air to the upper space chamber within each tube 41 and the water to the neck surfaces 53 thereby accomplishing a washing and rinsing operation on the one hand and a drying operation on the other, simultaneously. When the neck washing operation is completed the water supply master valve can be turned off, permitting the drying air valve to remain on for a short period thereafter. This practice will assure drying of the neck before the bottles are removed for further processing. In this way, there is achieved a coordination of fundamentally conflicting operations for the purpose of overcoming production impediments which are characteristically slow to accomplish.

While the present invention has been explained and described with reference to specifically contemplated embodiments and variations, it will be understood, nevertheless, that numerous alternative practices and apparatus is susceptible of being incorporated without departure from the essential spirit or scope thereof. Accordingly, it is not intended to be limited for an understanding of this invention to the particular language employed in the foregoing description nor to the arbitrary illustrations shown in the annexed drawings, except as to the extent indicated in the claims appended hereinafter.

The invention claimed is:

1. In an apparatus for rinsing and drying an envelope having an enlarged body and an open-ended neck extending therefrom means for supporting an envelope with the open end of the neck directed downwardly, a nozzle fixture adapted to be received within said envelope, said nozzle fixture comprising a tube adapted for connection to a drying fluid supply and having its upper extremity terminating within the body and having a discharge aperture adjacent said extremity for discharging a drying fluid into the body of said envelope for drying the interior surface of said body, an outer tube concentric with said first mentioned tube and spaced therefrom to provide a passageway therebetween, said outer tube being open at the top end thereof and terminating at its upper end just below the junction of the body and neck, coupling means for connecting said passageway to a supply of rinsing fluid, means carried on said first mentioned tube and arranged in close proximity to and above the open upper end of said outer tube for impingement by and deflection downwardly and outwardly of the fluid issuing from said open end for directing said fluid against the inner wall of the neck.

2. In an apparatus for rinsing and drying an envelope having an enlarged body and an open-ended neck extending therefrom, means for supporting the envelope with the open end of the neck thereof directed downwardly, a nozzle fixture adapted to be received within said envelope, said nozzle fixture comprising a tube adapted for connection to a drying fluid supply and having its upper extremity terminating within the body and having a plurality of discharge apertures adjacent said extremity for discharging a drying fluid into the body of said envelope for drying the interior surface of said body, an outer tube concentric with said first mentioned tube and spaced therefrom to provide a passageway therebetween, the upper end of said outer tube being positioned below the juncture of the neck and body of the envelope, coupling means for connecting said passageway to a supply of rinsing fluid, a hood carried about said first mentioned tube and disposed in spaced relation but in close proximity to and above the open end of said outer tube for impingement by and deflection downwardly and outwardly of the fluid issuing from said open end for directing said fluid against the inner wall of the neck.

3. In an apparatus for rinsing and drying an envelope having an enlarged body and an open-ended neck extending therefrom, means for supporting the envelope with the open end of the neck directed downwardly, a nozzle fixture adapted to be received within said envelope, said nozzle fixture comprising a tube adapted for connection to a drying fluid supply and having its upper extremity terminating within the body and having a discharge aperture adjacent said extremity for discharging a drying fluid into the body of said envelope for drying the interior surface of said body, an outer tube concentric with said first mentioned tube and spaced therefrom to provide a passageway therebetween, said outer tube being open at the top end thereof, coupling means for connecting said passageway to a supply of rinsing fluid, means carried on said first mentioned tube and arranged in close proximity to and above the open end of said outer tube for impingement by and deflection downwardly and outwardly of the fluid issuing from said open end for directing said fluid against the inner wall of the neck, and means for selectively supplying fluids respectively to said first mentioned and outer tubes and to both tubes simultaneously.

MELBERNE L. HAYES.

References Cited in the file of this patent

UNITED STATES PATENTS

| Number | Name | Date |
| --- | --- | --- |
| 103,371 | Reynolds | May 24, 1870 |
| 1,033,068 | Griffiths | July 16, 1912 |
| 1,584,913 | Wilson | May 18, 1926 |
| 1,727,464 | Debus | Sept. 10, 1929 |
| 1,748,604 | Heimburger | Feb. 25, 1930 |
| 1,914,309 | Tanner | June 13, 1933 |
| 1,963,520 | Barker | June 19, 1934 |
| 2,147,247 | Doty | Feb. 14, 1939 |
| 2,222,676 | Mahler | Nov. 26, 1940 |
| 2,240,364 | Kimball | Apr. 29, 1941 |